E. M. FINNEY.
ANIMAL TRAP.
APPLICATION FILED JULY 5, 1918.
1,295,143.
Patented Feb. 25, 1919.
2 SHEETS—SHEET 1.
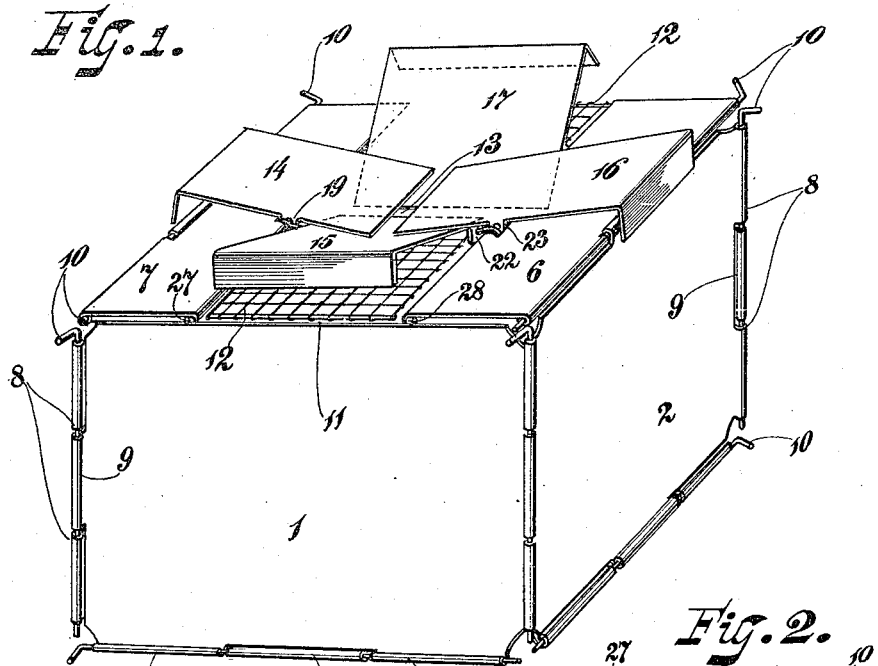
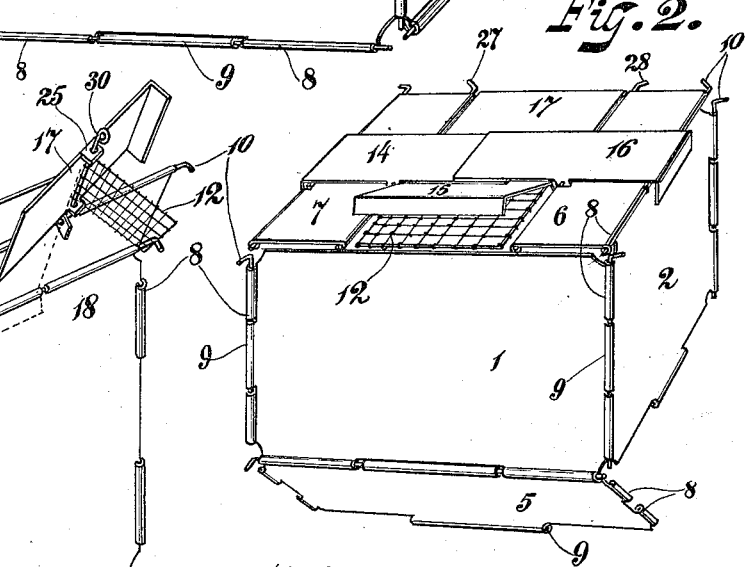
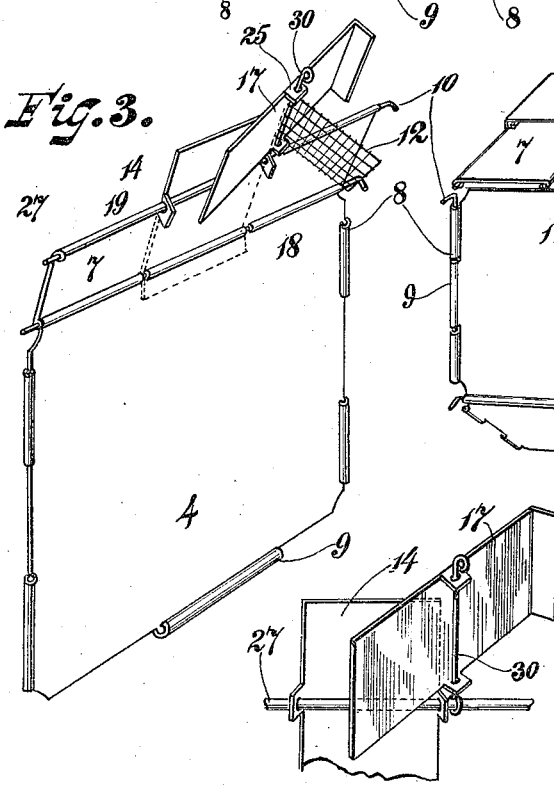
Inventor
Ellen M. Finney,
by Adam C Fisher
Attorney.

E. M. FINNEY.
ANIMAL TRAP.
APPLICATION FILED JULY 5, 1918.
1,295,143.
Patented Feb. 25, 1919.
2 SHEETS—SHEET 2.
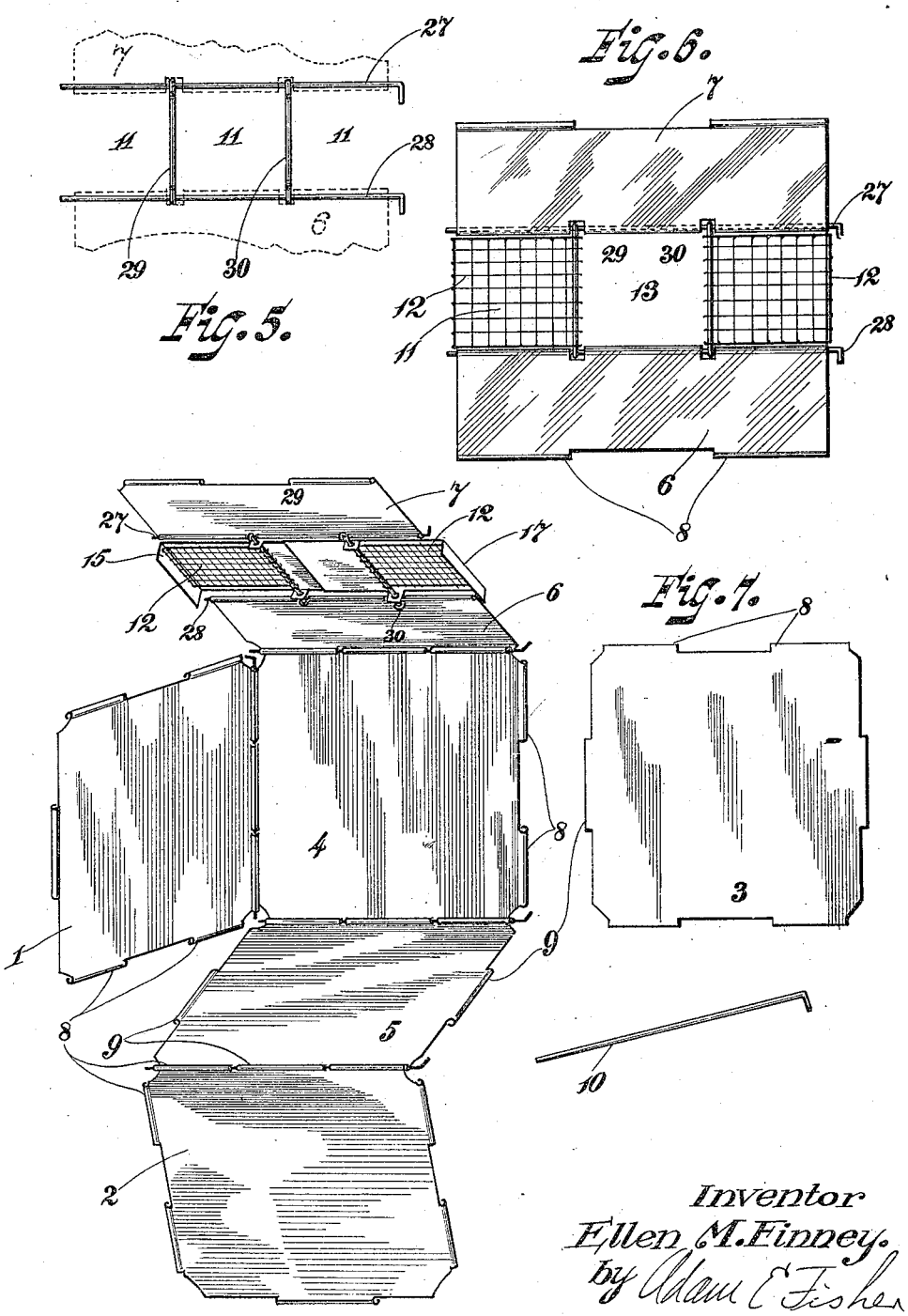
Inventor
Ellen M. Finney,
by Adam E Fisher
Attorney.

UNITED STATES PATENT OFFICE.

ELLEN M. FINNEY, OF KANSAS CITY, MISSOURI.

ANIMAL-TRAP.

1,295,143. Specification of Letters Patent. Patented Feb. 25, 1919.

Application filed July 5, 1918. Serial No. 243,334.

*To all whom it may concern:*

Be it known that I, ELLEN M. FINNEY, a citizen of the United States, residing in Kansas City, State of Missouri, have invented new and useful Improvements in Animal-Traps, of which the following is a specification, reference being had to the accompanying drawings.

This invention pertains to animal traps, and has for its object the production of a trap provided with a plurality of trap doors or trip doors arranged in the top thereof in such manner that as the animal climbs on the trap, the doors collapse and let him fall into the interior, after which the doors by gravity return to their original position and prevent the animal's egress.

Another object is the production of such trap in a simple, practical and efficient form, using as few parts as possible.

With these and other objects in view, attention is called to the accompanying drawings constituting a part of this specification, and wherein—

Figure 1 is a perspective showing the trap door partly depressed;

Fig. 2 is a perspective showing one trap door raised and revealing the screen thereunder;

Fig. 3 is a perspective of one side and a portion of the top showing two of the trap doors pivoted to the sides with one of the doors and accompanying screen slightly elevated;

Fig. 4 is a detail showing the method of mounting and assembling two oppositely disposed doors, that is, one door being located at right angles to the other;

Fig. 5 is a detail plan view of the pivot pins for the top of the trap;

Fig. 6 is a detail showing the method of mounting the screens on the top of the trap;

Fig. 7 shows the trap entirely taken apart for the purpose of cleansing.

Referring more particularly to the drawings, my invention consists of a plurality of side panels as 1, 2, 3 and 4, a bottom panel as 5, and top panels as 6 and 7. These panels are preferably pivoted or hinged together by cutting out the meeting edges and turning the end portions to form dove-tailing sleeves as shown at 8 and 9. Through these sleeves, pins as shown at 10 are thrust, thus effectually locking the panels together, and also affording means whereby the panels may be taken apart for cleansing, as desired.

It will be noted that the top panels 6 and 7 are relatively narrow, so as to leave a central space or opening 11 wide enough to permit an animal to fall therethrough. This elongated opening, however, is at the outer ends covered by a piece of wire netting as 12, so as to leave merely a center opening or hole 13 for the admission of the animal.

Immediately above this opening 13 are pivoted a plurality of trap doors as 14, 15, 16 and 17. The pivotal bearing points are preferably formed by turning down ears 18, 19, 21, 22, 23, 24, 25 and 26 medially along the edges of said trap doors, through which pivot pins 27, 28, 29 and 30 are thrust. The pivot pins 27 and 28 extend entirely across the top of the trap and are fastened at the end, while the pivot pins 29 and 30 may be cut short to span only the space between the pivot pins 27 and 28, the ends loosely overlying the same.

The screens 12 are likewise pivoted at their outer ends over the pivot pins 10, and at their inner ends over the pivot pins 29 and 30. The inner ends of the doors 14, 15, 16 and 17 projecting over the opening 13, normally close said opening, and said doors are so pivoted as aforesaid at relatively medial points that the outer ends of the doors overbalance the inner ends, and so normally keep the opening 13 closed.

Said doors are so balanced that the weight of an animal, as a rat, will suffice to depress the inner ends of said doors and permit the animal to fall down in the trap, after which the doors are turned to their original position.

It will be noted that by the arrangement of the screens 12 pivoted as aforesaid, two of the doors as 15 and 17 may be raised from the rear ends, so that the interior of the trap may be inspected through the screens without any danger of the animal escaping. It will also be noted that by this arrangement the entire trap may be quickly taken apart for cleansing, and as quickly reassembled.

While I have herein described a certain specific manner and method of constructing the elements of my invention, it is understood that I may vary from the same in minor details, not departing from the spirit of my invention, so as best to construct a practical device for the purpose intended, as defined in the appended claims.

What I claim to be new and patentable is:

1. A trap comprising a body, a top panel hingedly mounted thereon, and a door hingedly connected at a point between its ends with the panel at one edge thereof and having end portions which project beyond the opposite side edges of the panel.

2. A trap comprising a body, top panels mounted thereon, doors pivoted on the top panels, a pin detachably connected with the top panels, a screen connected with the pin and a door pivoted on the pin.

ELLEN M. FINNEY.

Witnesses:
A. L. McBRIDE,
J. D. SUTHERLAND.

Copies of this patent may be obtained for five cents each, by addressing the "Commissioner of Patents, Washington, D. C."